Jan. 6, 1959  K. Z. HUSZAR  2,867,000
MECHANISM FOR FORMING VARIOUS ARTICLES FROM MOLDABLE MATERIALS
Filed April 24, 1956
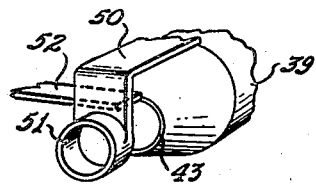
FIG.3.
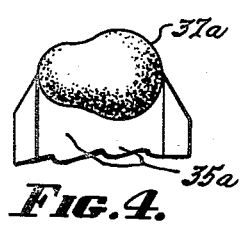
FIG.4.
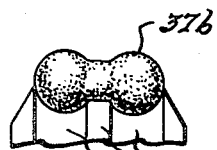
FIG.5.
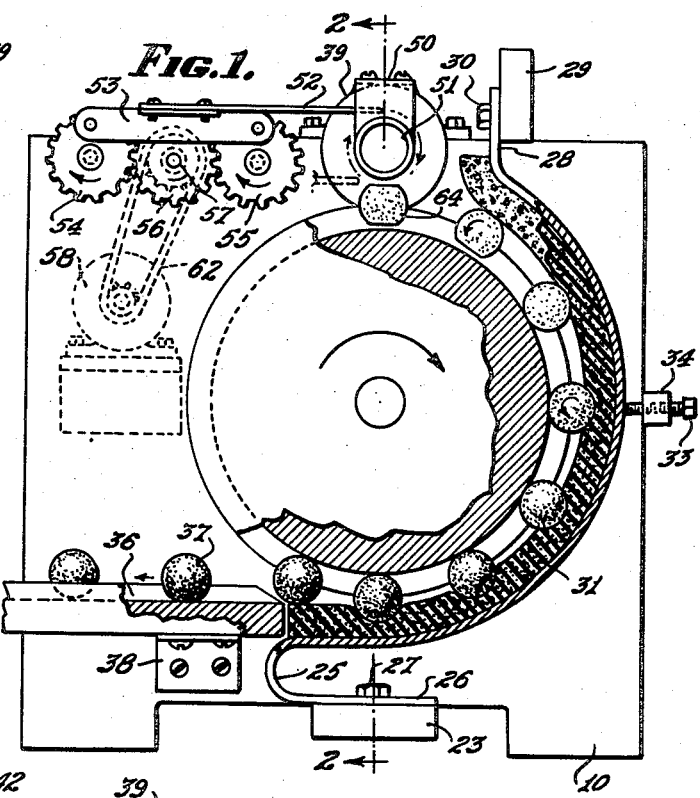
INVENTOR.
KALMAN Z. HUSZAR,
BY Allen & Allen
ATTORNEYS.

United States Patent Office 2,867,000
Patented Jan. 6, 1959

2,867,000

MECHANISM FOR FORMING VARIOUS ARTICLES FROM MOLDABLE MATERIALS

Kalman Z. Huszar, Foster, Ohio

Application April 24, 1956, Serial No. 580,358

11 Claims. (Cl. 18—5)

My invention resides in the provision of a mechanism for forming various shaped articles from molding compositions.

A specific object of my invention is to provide a mechanism for forming a spherical ball of any desired size.

Another specific object of my invention is to provide a mechanism for forming a clay pellet which may be made suitable for use with sling shots and the like as more fully taught in my copending application Serial No. 580,359 entitled Bodies of Revolution and Means and Methods of Making Them, filed April 24, 1956.

Yet another object of my invention is to provide means for shaping objects to be used in ball mills.

A further object of my invention is to provide a mechanism which, while particularly adapted for use in making spherical balls or pellets, may be modified to form bodies of revolution otherwise shaped.

These and other objects of my invention will become apparent to those skilled in the art during the course of the following description and with reference to the accompanying drawing, in which drawing like numerals are employed to designate like parts throughout and in which:

Figure 1 is a fragmentary front view, with parts shown in section, of apparatus embodying my invention, Figure 2 is a section taken on the line 2—2 of Figure 1, Figure 3 is a perspective view of certain of the means for providing a slug of moldable material to be shaped by the remaining mechanism, Figure 4 is a perspective view of a portion of the means and illustrating a modification for forming a pear-shaped object rather than a sphere, Figure 5 is a view similar to that of Figure 4 but showing a still further modification by which an article having a "dumb-bell" shape may be obtained, and Figure 6 is a fragmentary perspective and section showing a portion of the resilient cushion member employed with the mechanism of the invention.

Referring now to the drawings I have illustrated a frame member or plate 10 in which there is journaled a shaft 11 by means of a suitable bushing 12. Pinned on one end of the shaft 11 as indicated at 13 is a forming wheel 14. A collar 15 and pin 16 insure proper positioning of the shaft with respect to the frame. It will be understood that other frame members may be employed to give the desired rigidity to the mechanism. Thus, for example, another plate similar to that shown at 10 may be provided adjacent the other end of the shaft 11 in order to support it adequately.

As diagrammatically illustrated in Figure 2 a motor 17 having a speed regulator 18 may be provided to drive a shaft 19, sprocket 20, chain 21 and sprocket 22 fixed on the shaft 11. In this manner the forming wheel 14 may be rotated at any desired speed.

Fixed to a bar 23 extending from the frame 10 and maintained by a bracket 24 is a spring member 25. The major portion of the spring member 25 is arcuate, one end being return bent as at 26 so that it may be conveniently bolted to the bar 23 as indicated at 27. The other end of the spring member 25 is outwardly struck as at 28 so that it may be conveniently bolted to a frame member 29 as indicated at 30.

A relatively thick layer of sponge rubber of similar resilient material is cemented or otherwise suitably fixed to the spring member 25; this sponge rubber is indicated at 31. Preferably the surface of the material 31 opposite from the spring member 25 is provided with a skin of rubber or similar material as best seen at 32 in Figure 6. I have found that best results are obtained when the porous sponge rubber 31 is covered by the flexible rubber skin 32 in the manner illustrated; this skin should be impervious to prevent strike through of the materials constituting the molding composition to the base 31.

I find it desirable to provide a set screw 33 which operates within a block 34 fixed to the frame 10. By turning this screw so as to force it into engagement with the back side of the spring member 25, as best seen in Figure 1, I am able, for example, to widen slightly a distance between the bottom of the groove in the forming wheel 14 and the rubber skin 32 at the lower or discharge end of the spring 25 which I find it sometimes desirable to do. In addition other adjustments in the relationship between the wheel 14 and base 31 may be made by changing the location of the spring ends 26 and 28 as well as by adjustment of the screw 33.

As just mentioned for forming wheel 14 is provided with an annular groove which in the preferred embodiment of my invention is arcuate in cross-section as indicated at 35; preferably it corresponds to a hemisphere. The forming wheel itself may be formed from metal. By rotating the shaft 11 so as to turn the forming wheel 14 towards the spring 25 as illustrated by the directional arrow in Figure 1, and by introducing a slug of moldable material of a size sufficient to fill the groove 35 and be squeezed between it and the base 31 when rolled therebetween by rotation of the wheel, I am able to shape such slug so as to make it spherical upon its release at the discharge end of the spring 25. At this discharge end I provide a grooved member 36 to receive the formed spheres 37. This member 36 may be fastened to the frame 10 by a suitable bracket or the like 38.

In order to provide the necessary slug of moldable material I fasten an extruder 39 by means of a bracket 40 to the frame plate 10. Within the extruder 39 is a screw 41 or other suitable means for forcing the moldable material 42 through the extruder nozzle 43. The speed of rotation of the screw 41 may be regulated by the motor 44, speed control device 45, shaft 46, sprocket 47, chain 48 and sprocket 49 fixed to the screw shaft 41. This latter arrangement is diagrammatically illustrated in Figure 2.

Fixed to the extruder 39 is a limit gauge comprising a bracket 50 having a short tube 51 formed integral therewith. The diameters of the extruder nozzle 43 and tube 51 are substantially equal and are in axial alignment. The inner end of the tube 51 and outer end of the extruder nozzle 43 are spaced from one another above the groove 35 of the forming wheel 14 just sufficient to receive the movable cut-off blade 52. This is perhaps best seen in Figures 2 and 3.

Referring now to Figure 1 it will be observed that the cut-off blade 52 is fastened to a link 53 which is pivoted to a pair of sprockets 54 and 55, these sprockets being engaged with an intermediate sprocket 56. It will thus be observed that the sprockets 54 and 55 will turn in the same direction. The sprocket 56 is mounted on a shaft 57 which may be rotated by means of a motor 58, speed regulator 59, shaft 60, sprocket 61, chain 62 and a sprocket 63, this latter sprocket being fixed to the shaft 57.

Rotation of the sprockets 54 and 55 will cause the cut-off blade 52 periodically to move down between the tube 51 and extruder nozzle 43 so as to cut off a slug 64 from the material 42 extending between the extruder nozzle 43 and tube 51. The limit gauge 50 insures that the slugs 64 will be uniform. These slugs are engaged between the grooved wheel 14 and sponge rubber 31 and made spherical as indicated at 37 by rotation of the forming wheel 14 so as to roll the slug 64 from adjacent the end 28 of the spring 25 to its discharge end adjacent the receiving member 36. The wheel 14 and base 31 are adjusted with respect to slug size so as to rotate or roll said slug as it is moved along the base and squeezed between said base and the wheel.

It is contemplated that the slug of material cut off from the source by the blade 52 will be larger than that required in the finished body. The excess is trimmed off as the slug is rolled between the wheel 14 and base 31 by reason of the construction of the wheel 14 and its forming groove 35. Thus I provide shearing edges 69 adjacent the groove 35 on the wheel 14.

In Figure 4 I have shown how the groove 35 might be modified as indicated at 35a in order to form an object 37a which is pear-shaped rather than spherical. In Figure 5 I have shown how the groove 35 might be modified as indicated at 35b in order to produce an article 37b which resembles that of a dumb-bell. Obviously bodies of revolution having other shapes may be produced by changing the contour of the groove 35.

In operation, a quantity of moldable material 42 is placed within the extruder unit 39. In the formation of grinding balls for use in ball mills I contemplate the use of a material 42 which is moldable, for example, clay, in which necessary additives are included to insure the hardness desired in such balls when they are subjected to finishing operations and so forth. In making pellets for sling shots the material 42 is preferably a moist clay. In any event the particular material used does not constitute a limitation of the apparatus herein described nor the method utilized except insofar as the material must at least be capable of being molded to a desired shape. In my said copending application Serial No. 580,359 filed April 24, 1956 and entitled Bodies of Revolution and Means and Methods of Making Them I have shown, described and claimed a particular material especially adapted for making sling shot pellets and grinding balls. The instant invention is limited to the means and methods of imparting the desired form to an article while my said copending application includes all the steps and apparatus necessary to finish certain articles.

The limit gauge 50 is adjusted so that the slug 64 of material 42 cut by the blade 52 is more than actually required in the formed article. The slug 64 must be sufficient that it will be distorted when rolled by rotation of the forming wheel 14 into engagement with the sponge rubber backed skin 32. As the slug is thus rolled and squeezed the excess material will be trimmed off by the groove edges 69. Preferably the upper part of the spring 25 and base 31 are farther from the wheel 14 than is the center part so that formation of the article body is effected gradually.

The members 18, 45 and 59 are adjusted so as to produce proper rotation of the shafts 11, 41 and 57 respectively. In this manner a quantity of material is periodically brought into position between the extruder nozzle 43 and gauge 51 whereupon it will be broken from the main body of material 42 by action of the blade 52. The slug 64 so formed will fall upon the grooved wheel 14 which is rotating at the speed selected by the member 18. A succession of slugs 64 will thus be brought in the groove 35 and moved into contact with the base of sponge rubber 31. The completed bodies 37 will fall within the grooved member 36 and be conducted to a suitable hopper or other receptacle. Some adjustment may be effected by the set screw 33 as desired.

It will be understood that although I have shown my invention as embodied in certain particular structures and arrangements. I do not intend to be limited to such structures and arrangements except insofar as they are specifically set forth in the subjoined claims. It will be further understood that various modifications and arrangements may be made in the apparatus of this invention without departing from its scope and spirit.

Having thus described my invention, what I claim as new and what I desire to protect by United States Letters Patent is:

1. Mechanism for forming articles of moldable material which comprises: a frame, an arcuate spring fixed to said frame, a resilient pad fixed to said spring, a shaft journaled in said frame, a grooved forming wheel fixed on said shaft, means to rotate said shaft, an extruder adjacent said wheel for supplying moldable material, and a cut-off blade adjacent said extruder for delivering a slug of said moldable material to said grooved wheel, said slug being sufficient to be rolled and squeezed between said pad and said wheel by rotation of said wheel.

2. The mechanism of claim 1 in which means are provided to move the center of said arcuate spring towards said grooved wheel.

3. The mechanism of claim 1 in which the groove in said wheel is arcuate in cross section.

4. The mechanism of claim 1 in which said extruder has a circular nozzle, and a stub tube spaced axially from said nozzle and of substantially the same diameter as said nozzle, said cut-off blade being movable between said nozzle and tube.

5. The mechanism of claim 1 including a pair of sprockets rotatable in the same direction, a link pivoted to said sprockets, said cut-off blade being fixed to said link, and means to rotate said sprockets.

6. The mechanism of claim 1 including a grooved member to receive articles discharged from between said grooved wheel and resilient pad.

7. The mechanism of claim 1 in which said resilient pad comprises a relatively porous resilient base material covered by an impervious flexible skin.

8. The mechanism of claim 1 in which the groove in said wheel has a shallow portion and a deep portion so as to form a pear shaped article.

9. The mechanism of claim 1 in which the groove in said wheel has a pair of deep portions separated by a ridge so as to form a dumb-bell shaped article.

10. The mechanism of claim 1 in which shearing edges are provided for the groove in said wheel.

11. Apparatus comprising a frame, a rotatable circular wheel having a groove throughout its perimeter, an arcuate spring spaced from said wheel, a resilient pad on said spring, means to rotate said wheel on its axis toward said pad, and means for placing a slug of said material on said grooved wheel so that said slug will be squeezed and rolled between said wheel and pad.

References Cited in the file of this patent
UNITED STATES PATENTS

| | | |
|---|---|---|
| 754,165 | Ripley | Mar. 8, 1904 |
| 868,860 | Hoffmann | Oct. 22, 1907 |
| 1,164,718 | Hill | Dec. 21, 1915 |
| 2,649,618 | Rhodes et al. | Aug. 25, 1953 |